United States Patent [19]

Henriksson

[11] Patent Number: 5,128,965
[45] Date of Patent: Jul. 7, 1992

[54] DIGITAL RADIO LINK SYSTEM AND A METHOD OF ADJUSTING THE TRANSMISSION POWER IN A DIGITAL RADIO LINK SYSTEM

[75] Inventor: Jukka Henriksson, Espoo, Finland

[73] Assignee: Nokia Oy, Helsinki, Finland

[21] Appl. No.: 611,111

[22] Filed: Nov. 9, 1990

[30] Foreign Application Priority Data

Nov. 14, 1989 [FI] Finland .................................. 895419

[51] Int. Cl.⁵ .......................... H04L 1/16; H04L 1/20
[52] U.S. Cl. ...................................... 375/58; 371/5.5; 455/69
[58] Field of Search ....................... 370/10, 34, 58, 98, 370/99, 101, 79; 371/5.1, 5.3, 5.4, 11.1, 11.2, 5.5; 455/52, 63, 69, 68

[56] References Cited

U.S. PATENT DOCUMENTS

| | | | |
|---|---|---|---|
| 3,745,464 | 7/1973 | Lee | 455/69 |
| 4,004,224 | 1/1977 | Arens et al. | 455/10 |
| 4,309,771 | 1/1982 | Wilkens | 375/58 |
| 4,752,967 | 6/1988 | Bustamante et al. | 455/69 |
| 4,777,653 | 10/1988 | Bonnerot et al. | 375/58 |

FOREIGN PATENT DOCUMENTS 0112108 6/1984 European Pat. Off.
2592256 2/1988 France.

*Primary Examiner*—Benedict V. Safourek
*Attorney, Agent, or Firm*—Finnegan, Henderson, Farabow, Garrett and Dunner

[57] ABSTRACT

The invention relates to a digital radio link system and a method of adjusting the transmission power in a digital radio link system. The system comprises at a receiving end a first means for monitoring the error rate estimate and for producing a first control signal if the error rate estimate exceeds a predetermined threshold value. At a transmitting end the system comrises means for adjusting the transmission power, said means responding to the occurrence of the first control signal by increasing the transmission power. In the system of the invention there is further provided at the receiving end a second means for monitoring the rate of change of the received signal level and for producing a second control signal if the rate of change exceeds a predetermined threshold value. The means for adjusting the transmission power respond to the occurrence of the first or the second control signal by increasing the transmission power temporarily close to the maximum transmission power.

15 Claims, 4 Drawing Sheets

DIGITAL RADIO LINK SYSTEM AND A METHOD OF ADJUSTING THE TRANSMISSION POWER IN A DIGITAL RADIO LINK SYSTEM

FIELD OF THE INVENTION

The invention relates to a method of adjusting the transmission power in a digital radio link system by monitoring the received signal level and the error rate estimate at the receiving end.

BACKGROUND OF THE INVENTION

On determining the transmission power of a digital radio link system, not only the so-called constant power dissipations caused by the link span but also random signal fades caused by multi-path propagation, for instance, have to be taken into account. Therefore the transmission power of the transmitter is often adjusted to a value considerably above the minimum transmission power which in normal conditions would suffice for interference-free reception at the other end of the link span. Excessive transmission power provides the link span with a power margin which ensures interference-free reception even in difficult conditions. On the other hand, however, high transmission power increases interference in adjacent channels or systems. This hampers the realization of dense radio link networks, efficient utilization of frequency bands and the reuse of the same frequency within the same area.

U.S. Pat. No. 4,004,224 discloses a method in which transmission power within a certain link span is increased automatically if fading is observed within this specific span, so that a constant reception power is maintained at the receiver. The receiver produces a signal representing the level of the received signal, and this signal is sent through a return channel to the transmitter for the adjustment of the transmission power.

In U.S. Pat. No. 4,309,771, the bit error rate of the received digital signal is monitored in place of the received signal level, and the transmission power is adjusted through the return channel in such a way that the bit error rate of the received signal does not exceed a predetermined threshold value.

In French Patent 2,592,256 the range of adjustment is, in principle, divided into two portions. At low reception levels the transmitter is instructed through the return channel to increase power to compensate for fading. At high levels the error rate too is monitored. If the error rate is high irrespective of the sufficient level, the transmission power is increased temporarily so that it exceeds the normal backoff of 6 dB (such as a backoff of 3 dB).

The above-described methods aim at adjusting the transmission power so as to decrease the transmission power required in normal conditions in order to decrease the interference caused in other link spans or channels while enabling sufficient quality of data transmission even during the fading periods. These methods, however, are not sufficiently effective in all situations.

SUMMARY OF THE INVENTION

The object of the present invention is to provide an improved method of adjusting the transmission power of a digital radio link.

This is achieved by monitoring the rate of change of the received signal level and the error rate estimate; and increasing the transmission power temporarily to a value close to the maximum transmission power if the rate of change of the received signal level or the error rate estimate exceeds a predetermined threshold value.

By monitoring the rate of change of the received signal level, rapid fades occurring in multi-path propagation can be detected efficiently. With multi-path propagation, fading may be very rapid (as rapid as 100 dB/s and more), so that changes in the level of reception can be difficult to compensate for by real-time adjustment of the transmission power through the return channel due to, for instance, the delay of the return channel. In the method of the invention the transmission power is therefore set to its highest normal value for some time when rapid fading is detected. This makes it easier to control rapidly changing situations and stabilizes the adjustment. In addition, it is possible during multi-path fading that the received signal level is sufficient but errors occur in the reception due to interaction between channels. In the preferred embodiment of the method of the invention the transmission power is therefore increased from a value close to the maximum transmission power to the maximum transmission power if the error rate estimate exceeds the predetermined threshold value in addition to the detected multi-path condition. This degrades the signal to some extent, whereby the long-term error rate can be of the order of 1E-7 ... 1E-8. In a multi-path condition, it is, however, necessary to bring the error rates 1E-3 ... 1E-6 under control, whereby the use of the maximum transmission power for a limited period of time is advisable.

If the monitored error rate estimate exceeds the predetermined threshold value in normal conditions (no multi-path condition), the transmission power is increased temporarily close to the maximum transmission power. In this way rapid response to errors is achieved. This kind of situation may occur due to temporary propagation conditions, whereby some remote system may disturb for some time.

In the preferred embodiment of the invention, slow variation in the level of reception, which may be due to variation in the k value, for instance, is compensated for by monitoring the level of reception. If the level of reception falls below a predetermined minimum, the transmission power is adjusted through the return channel by increasing it by a small increment. In this way the quality of the received signal remains sufficiently good while avoiding use of excessive transmission power and adjacent system interference.

By means of the method of the present invention, the transmission power can be adjusted in such a way that it is maintained at an optimal value in normal conditions while providing rapid response to interferences, thus ensuring interference-free reception.

The invention is also concerned with a digital radio link system for applying the method of the invention.

BRIEF DESCRIPTION OF THE DRAWINGS

The invention will now be described by means of exemplifying embodiments with reference to the attached drawings, wherein.

DETAILED DESCRIPTION OF THE INVENTION

Figure 1:
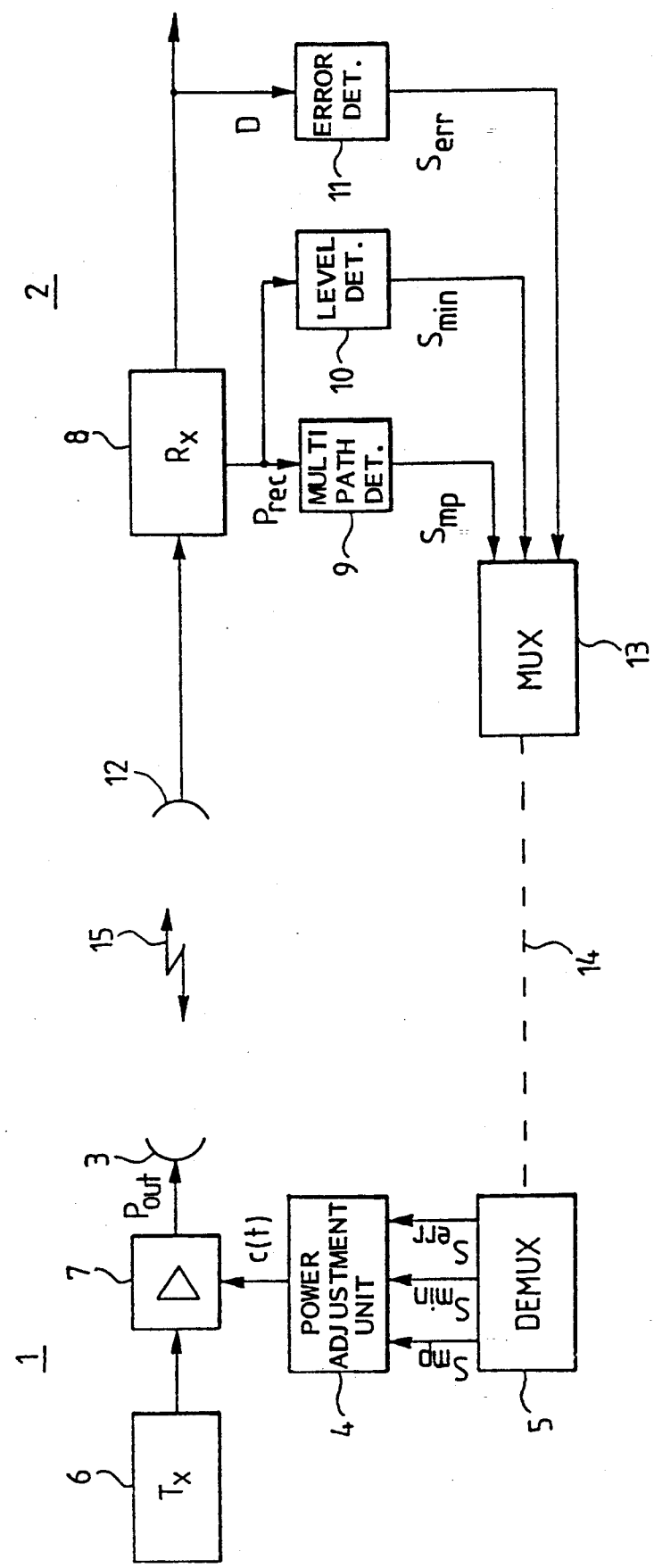
FIG. 1 shows a block diagram of a digital radio link system according to the invention.

FIG. 1 shows a radio link system according to the invention, comprising a transmitter unit 1 and a receiver unit 2. In the transmitter unit 1, a transmitter or modulator part 6 applies a modulated highfrequency signal to a high-frequency amplifier stage 7, such as an output stage, which amplifies the signal and applies it to a transmitter antenna 3. At the other end of a link span 15, a receiver antenna 12 receives the signal sent by the transmitter unit 1 and applies it to a receiver 8, in which the signal is detected A block 9 in the receiver unit 2 monitors the rate of change of the received signal level, particularly rapid level drops, to detect a multi-path condition, and produces a 1-bit signal $S_{mp}$ the state of which is 1, if a multi-path condition occurs, and 0 if no multi-path condition is present. In the case of FIG. 1 the block 9 compares the present value of the AGC voltage $P_{rec}$ of the receiver 8 with a short-term average of the voltage or merely with a preceding value. If the present value of the AGC voltage $P_{rec}$ deviates at least to a predetermined extent from the short-term average or the preceding value, the change is interpreted to have been caused by a rapid fade, and the state of the output signal $S_{mp}$ of the block 1 is given the value 1.

A block 10 in the receiver unit monitors the received signal level, and produces a 1-bit signal $S_{min}$, if the received signal level is below a predetermined threshold value $L_{min}$. In the preferred embodiment, the block 10 also monitors the value of the AGC voltage $P_{rec}$ of the receiver 8. The threshold value $L_{min}$ is set so that the residual error rate of the system will be sufficiently good. The limit value $L_{min}$ is preferably of the order of about 10 to 12 dB above the threshold level of the receiver 8.

A block 11 in the receiver unit produces a 1-bit signal $S_{err}$ the state of which is 1 if an error condition occurs at the reception and 0 if no error condition occurs. The error condition may be, for instance, N errors per time unit (e.g. per one minute). In the preferred embodiment of the invention the signal $S_{err}$ obtains the state 1 immediately after N errors have occurred even though the time would not have run out. The errors can be counted, e.g., from the parity of the frame. The error signal can also be produced from the pseudo-error signal occurring in connection with the receiver 8. When the estimated error rate is greater than a predetermined threshold value, the state of the signal $S_{err}$ is given the value 1.

The binary signals generated by the blocks 9, 10 and 11 are multiplexed by a multiplexer 13 and sent through a low-capacity return control channel 14 to the transmitter unit 1. In the transmitter unit 1 a demultiplexer 5 demultiplexes the received signal and applies the signals $S_{mp}$, $S_{min}$ and $S_{err}$ to the transmission power adjustment block 4. The transmission power adjustment block generates, on the basis of these signals, an adjusting voltage c(t) which controls the amplifier stage 7 of the transmitter unit 1. By means of the adjusting voltage c(t) a high-frequency power $P_{out}$ applied by the amplifier stage 7 to the antenna 3 can be adjusted in response to the quality of the signal received by the receiver unit 2.

Figure 2:
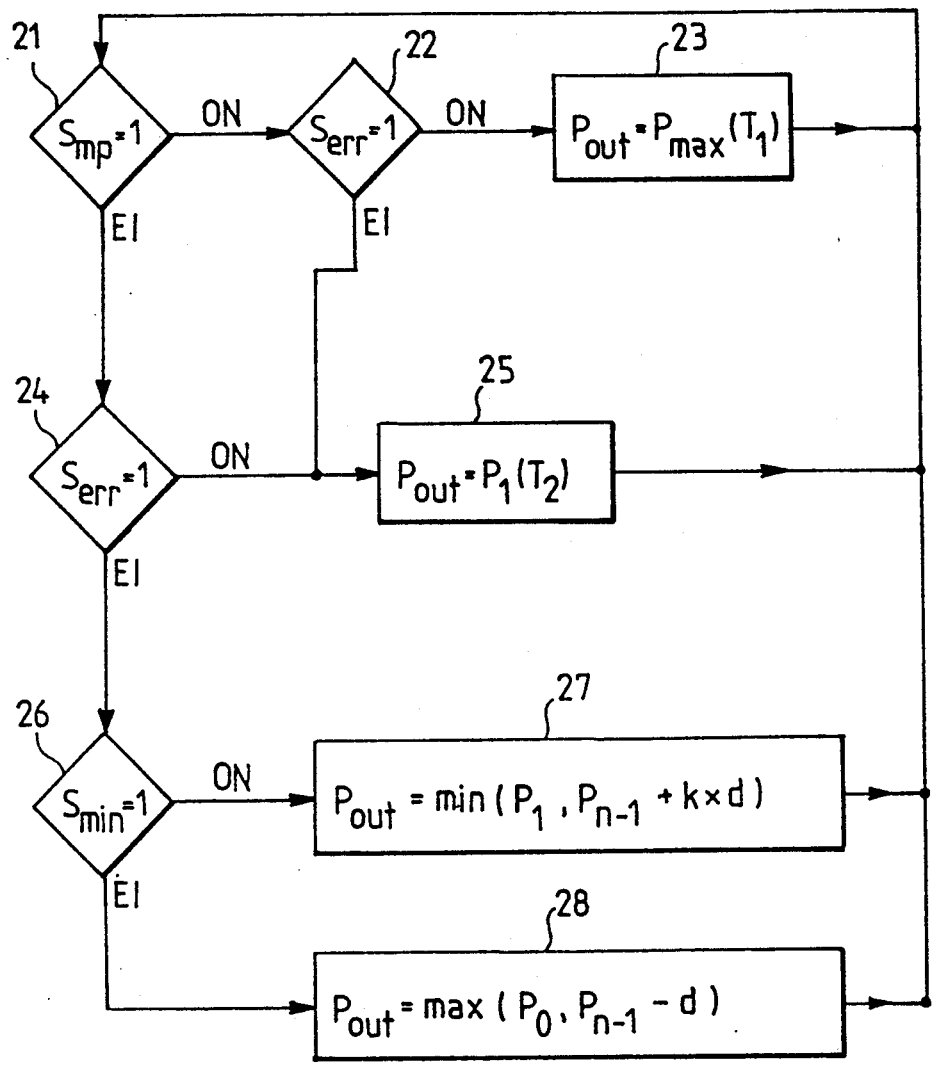
FIG. 2 shows a flow chart of the transmission power adjustment unit 4 of FIG. 1.

The functions of the transmission power adjustment unit 4 are illustrated by the operational diagram of FIG. 2.

To begin with, the presence of a multi-path condition is monitored by detecting the state of the signal $S_{mp}$ representing an excessive rate of change of the signal level. If a multi-path condition is detected ($S_{mp}=1$), the state of the signal $S_{err}$ representing an error condition is monitored at point 22 to find out whether an error condition is present. If $S_{err}=1$, a multi-path condition and error condition are simultaneously present, as a result of which a maximum transmission power $P_{max}$ is set at point 23, and the transmission is continued at this value for a period of time T1 from the last detection of simultaneous multi-path and error condition. With a 16QAM signal, the maximum transmission power may be, e.g., 2 to 4 dB and with a 4QAM signal about 0 to 2 dB below the level of a 1 dB compression point. The time period T1 may be of the order of 5 to 10 minutes, for instance. This use of maximum transmission power aims at minimizing the time during which the error rate at the reception is inferior to $10^{-3} \ldots 10^{-6}$.

If point 22 gives as a result $S_{err}=0$ (no error condition), the transmission power is set to a value $P_1$ at point 25, which is slightly below the maximum transmission power, and with a 16QAM signal, for instance, about 6 to 8 dB below the compression level of 1 dB. With the transmission power P1, distortions are small and it is thus possible to achieve a good residual error rate (BBER). The transmission is continued at the power P1 for a time period T2 from the last detection of multi-path condition. The time period T2 is of the order of 15 to 20 min, for instance.

If point 21 gives as a result $S_{mp}=0$, that is, there is no multi-path condition present, the possible presence of an error condition is checked at point 24 by means of the signal $S_{err}$. If $S_{err}=1$ at point 24, one goes to point 25, at which the transmission power is set to the above-mentioned value P1 for the time period T2. Errors occurring without multi-path condition may be due to interference caused by exceptional propagation conditions. In such a case the situation may continue for a long period of time and it is not advisable to send the maximum transmission power $P_{max}$.

If point 24 gives as a result $S_{err}=0$, the received signal level is monitored at point 26 by means of the signal $S_{min}$. If $S_{min}=1$, that is, the received signal level is below a minimum reception level L, the preceding value $P_{n-1}$ of the transmission power is increased by an increment k·d, where k is a proportional coefficient $\geq 1$, typically between 2 and 4) and d is a basic increase. After the increase, the maximum value of the transmission power should not exceed the above-mentioned power P1. By selecting k>1, the increase in the transmission power is more rapid than its decrease.

If point 26 gives as a result $S_{min}=0$, that is, the level of reception is above the minimum reception level L, the transmission power is decreased from the preceding value $P_{n-1}$ by the increment d. These changes are typically below 1 dB, because the updating is carried out, for instance, once a minute or more frequently. The rate of change of the transmission power should be less than 1 dB/s in order to prevent the interpretation of the change as a multi-path condition at the receiving end. The transmission power will not fall below a predetermined value $P_0$ which is the transmission power in normal conditions. The link span is so dimensioned that the transmission power $P_0$ in normal conditions results in a reception level which is above the minimum reception level L. Accordingly, the transmission power is nearly constantly $P_0$, and the system operates about 12 to 14 dB above the threshold level of the receiver Higher power levels are applied only exceptionally, that is, in case of multi-path and error condition.

Figure 3:
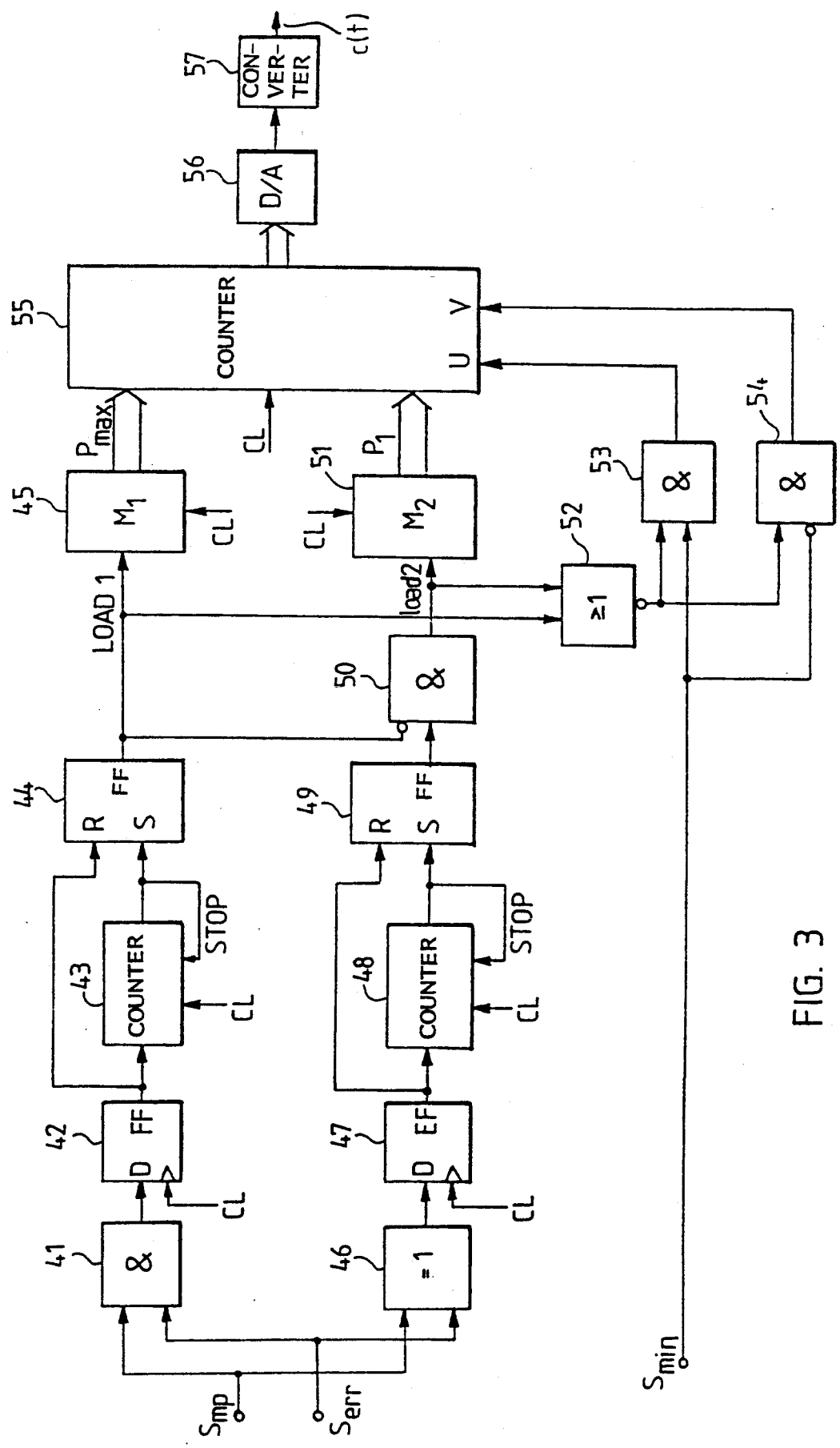
FIG. 3 shows the circuit diagram of the transmission power adjustment unit 4 of FIG. 1.

FIG. 3 shows diagrammatically the principles of one possible realization of the unit 4 for adjusting the transmission power.

The signals $S_{mp}$ and $S_{err}$ are applied to an AND gate 41 the output of which is connected to a flip-flop 42. If both signals $S_{mp}$ and $S_{err}$ have the state 1, the gate 41 and the flip-flop 42 reset and start a counter 43 which counts the time period T1. The output of the flip-flow 42 causes an output LOAD1 in another flip-flop 44 to have the state 1 during the counting. When the counting of the counter 43 is completed after the time period T1, the counter 43 sets the output LOAD1 of the flip-flop 44 to the state 0. The signal LOAD1 controls a memory circuit 45. During each cycle of a clock signal CL, a count corresponding to the maximum power $P_{max}$ is loaded from the memory circuit 45 to a counter 55 as long as the signal LOAD1 has the state 1.

The signals $S_{mp}$ and $S_{err}$ are also applied to an exclusive-OR gate 46 which controls, through a flip-flop 47, a counter 48 counting the time period T2. The counter 48 is reset and started whenever any of the signals $S_{mp}$ and $S_{err}$ has the state 1, that is, when either a multi-path or error condition is present. An output signal from a flip-flop 49 is set to the state 1 during the counting of the counter 48 and it is applied to one input in an AND gate 50. The signal LOAD1 is applied to another input, that is, an inverting input, in the AND gate, whereby the output signal LOAD2 of the gate 50 has the state 1 only if the signal LOAD1 has the state 0 and the output signal of the flip-flop 49 has the state 1. A count corresponding to the transmission power $P_1$ is applied from a memory circuit 51 to the counter 55 during each cycle of the clock signal CL as long as the signal LOAD2 has the state 1. The gate 50 ensures that the maximum power $P_{max}$ is loaded in the first place in case of competition between $P_{max}$ and $P_1$.

The signal $S_{min}$ is applied directly to AND gates 53, 54 and the signals LOAD1 and LOAD2 through a NOR gate 52. In this way, the adjustment of the transmission power takes place by means of the signal $S_{min}$ only if neither multi-path condition nor error condition is present, whereby the signals LOAD1 and LOAD2 both have the state 0 and the output of the gate 52 has the state 1. The signal $S_{min}$ is thereby able to affect the counter 55 through the gates 53 and 54. If the signal $S_{min}=1$, i.e., the received level is below the minimum reception level L, an increase k·d is applied to the input of the counter 55. If the signal $S_{min}=0$, i.e., the minimum reception level is exceeded, the increment d is extracted from the contents of the counter 55 through an input D. The counter 55 controls internally that the transmission power adjusted therethrough does not exceed the power $P_1$ or is not below the power $P_O$.

The above-described operation can, of course, also be realized as a microprocessor programme.

The digital output of the counter 55 is applied to a D/A converter 56 which produces an analog voltage. If required, this voltage can be subjected to a nonlinear conversion in the block 57 if it is desired that the power increment steps on the dB scale should be substantially of the same size. As a result, an adjusting voltage c(t) is achieved, by means of which one amplifier in the amplifier sequence of the transmitter is adjusted, such as the high-frequency terminal amplifier.

The counting block 6 described above can be realized in a simpler form. One alternative is to apply the same time period T1 for sending both the maximum power $P_{max}$ and the power $P_1$. Thereby one circuit suffices for the counting of time. In the microprocessor implementation, it might be possible to save a few program steps in this way.

Another alternative, probably applicable with constant-amplitude modulation methods, is to use a single higher power value $P_1$ in place of the powers P1 and $P_{max}$ and correspondingly a single time period T2. This simplifies the realization considerably.

The adjusting principle could also be modified by monitoring possible exceeding of a predetermined maximum reception level U. If the received level is between L and U, there is no need to change the power level. If the level U is exceeded, the transmission power is decreased. An advantage of this alternative would be the less frequent changes in transmission power and more reliable detection of multi-path condition. A drawback is the need of an additional bit to transfer information to the transmitter.

Figure 4:
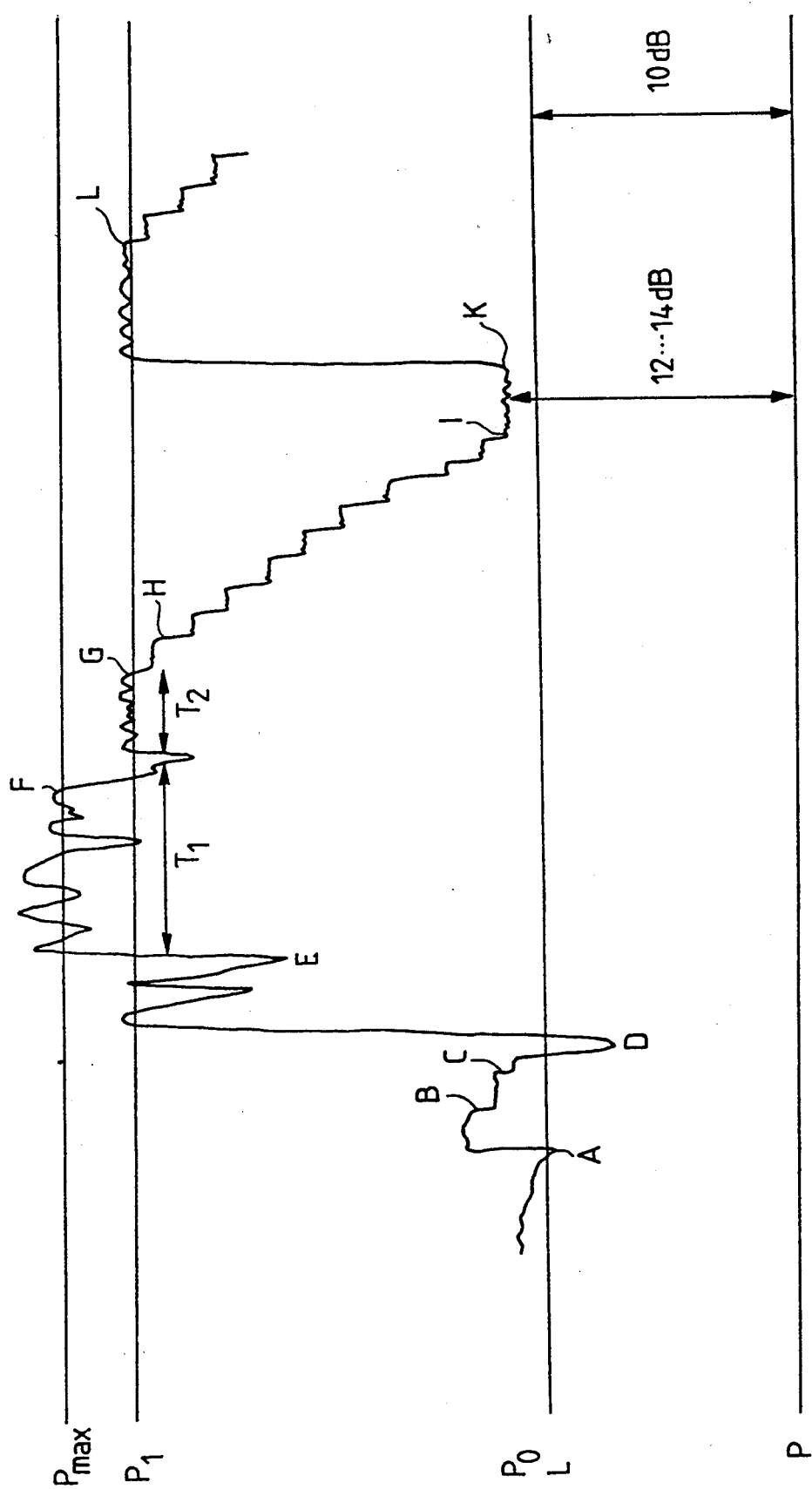
FIG. 4 illustrates graphically the adjustment of transmission power according to the invention in an imaginary reception situation.

FIG. 4 illustrates the operation of the adjusting method of the invention in an imaginary reception situation. At point A the received signal level is below the predetermined minimum reception level L, whereby the transmitter is adjusted to some extent (an increment k·d is added to the counter 55) to increase the power. At point B it is to be seen that the reception level exceeds the minimum reception level L and the increment d is extracted from the counter 55. The same takes place during the following clock cycle at point C.

At point D, a rapid change in the received signal level as compared with the short-term average is detected, such as a difference of 3 to 5 dB or a rate of change which is greater than 3 to 5 dB/s. The power $P_1$ close to the maximum power is thereby adjusted in the transmitter. At point E both multi-path and error condition are detected, and the maximum transmission power $P_{max}$ is connected to the transmitter for the time period T1. No further errors are detected, but the multi-path condition continues. At point F, the transmission power is decreased from the maximum power $P_{max}$ to the value $P_1$ after the time period T1 has elapsed from the last detection E of errors. At point G the time period T2 has elapsed from the last detection of multi-path condition, whereby the transmission at the power $P_1$ is interrupted and the adjustment is begun to be carried out with the signal $S_{min}$. It is thereby observed at point G that the minimum reception level L is exceeded and the output power $P_{out}$ is decreased by the increment d. The same takes place at point H within the following clock cycle and the transmission power falls gradually until the normal transmission power $P_O$ is achieved at point I.

At point K, an error condition occurs without the multi-path fading. The transmission power is thereby increased to the value $P_1$. The power is transmitted for the time period T2 after the last detection of an error condition. At point L the adjustment again takes place with the signal $S_{min}$ which decreases the transmission power gradually or monotonously toward the value $P_O$.

The attached figures and the description related to them are only intended to illustrate the present invention. In their details the method and the system of the invention may vary within the scope of the attached claims.

I claim:

1. A method of adjusting transmission power in a digital radio link system, comprising the steps
    transmitting a digital signal from a transmitting end of the link system at a normal transmission power value less than a maximum transmission power value.
    receiving said digital signal at a receiving end of the link system, said received digital signal having at times errors and signal level changes;
    detecting and monitoring the rate of change of the received signal level and the rate estimate of errors at the receiving end; and
    increasing the transmission power value at the transmitting end to a first value between the normal transmission power value and the maximum transmission power value at times when either the error rate estimate or the rate of change of the received signal level in the alternative exceeds a respective predetermined threshold value.

2. A method according to claim 1, further comprising the step of
    increasing the transmission power value to the maximum transmission power value at times when both the error rate estimate and the rate of change of the signal level exceed simultaneously the respective predetermined threshold values.

3. A method according to claim 2, further comprising the step of restoring the transmission power value from the value between the normal value and the maximum transmission power value to the normal power value a predetermined time after the most recent detection of either one of an error rate estimate or a rate of change of the received signal level exceeding the respective threshold value.

4. A method according to claim 3, wherein the step of restoring the transmission power includes the substep of restoring the transmission power value to the normal value as a function of time either in discrete steps or continuously.

5. A method according to claim 1, further comprising the step of increasing the transmission power by an increment less than the difference in value between the normal power value and the first value at times when the rate of change of the received signal level and the error rate estimate do not exceed the respective predetermined threshold and the received signal level is below a predetermined threshold level.

6. A method according to claim 5, further comprising the step of:
    decreasing the transmission power a predetermined increment at times when the error rate estimate and the rate of change of the signal level do not exceed the respective predetermined signal levels and the received signal level exceeds a predetermined threshold value.

7. A method according to claim 1, wherein the step of detecting and monitoring the rate of change of the received signal level includes comparing each detected signal lever either with a level corresponding to one of an average of received signal levels and a preceding detected signal level.

8. A system according to claim 7, wherein said means at the transmitting end for adjusting the power value includes means responsive to the simultaneous production of the first and the second control signals for increasing the transmission power value to the maximum power value.

9. A system according to claim 8, wherein said means for adjusting the transmission power includes means responsive to the absence of the first, second and third control signals for decreasing the transmission power value by a predetermined increment.

10. A method according to claim 1, further comprising the step of restoring the transmission power value from the value between the normal value and the maximum transmission power value to the normal power value a predetermined time after the most recent detection of either one of an error rate estimate or a rate of change of the received signal level exceeding the respective threshold value.

11. A method according to claim 10, wherein the step of restoring the transmission power includes the substep of restoring the transmission power value to the normal value as a function of time either in discrete steps or continuously.

12. A digital radio link system having a transmitting end and a receiving end, comprising:
    a transmitter at the transmitting end for transmitting digital signals at adjustable power values;
    means at the transmitting end for at times adjusting the transmitting power values between a normal power value and a maximum power value;
    a receiver at the receiving end for receiving said digital signals, said received digital signals at times having errors and different signal levels;
    first means at the receiving end for detecting and monitoring an estimate of the error rate of the received digital signals;
    second means at the receiving end for detecting and monitoring a rate of change of the level of the received digital signals;
    first control signal producing means at the receiving end governed by the first detecting and monitoring means for producing a first control signal at times when the estimate of the error rate exceeds a first predetermined threshold value; and
    a second control signal producing means at the receiving end for producing a second control signal at times when the rate of change of the level of the received signal exceeds a second predetermined threshold value;
    the means for adjusting the transmitting power value including at the transmitting end, means responsive to the reception of either one of the first and second control signals in the alternative for increasing the adjustable power value to a value between the normal power value and the maximum power value.

13. A system according to claim 12, wherein said means at the transmitting end for adjusting the transmission power value includes means responsive to the simultaneous production of the first and the second control signals for increasing the transmission power value to the maximum transmission power value.

14. A system according to claim 12, further comprising:
    means at the receiving end for monitoring the received signal level and third means at the receiving end governed by the received signal level monitoring means for producing a third control signal at times when the received signal level is below a third predetermined threshold value; and said means for adjusting the transmission power value includes means for increasing the transmission power in response to the third control signal and the absence of the first and the second control signals.

15. A system according to claim 14, wherein said means for adjusting the transmission power includes means responsive to the absence of the first, second and third control signals for decreasing the transmission power value by a predetermined increment.

* * * * *

UNITED STATES PATENT AND TRADEMARK OFFICE
CERTIFICATE OF CORRECTION

PATENT NO. : 5,128,965

DATED : July 7, 1992

INVENTOR(S) : Jukka Henriksson

It is certified that error appears in the above-identified patent and that said Letters Patent is hereby corrected as shown below:

```
On the title page:
Abstract, line 7, change "comrises" to --comprises--;

Claim 1, column 7, line 5, after "steps" insert --of--;
         column 7, line 9, change "value." to
                --value;--;

Claim 7, column 7, line 62, change "lever" to --level--.
```

Signed and Sealed this

Thirty-first Day of August, 1993

Attest:

BRUCE LEHMAN

*Attesting Officer*   *Commissioner of Patents and Trademarks*